United States Patent
Burt

(10) Patent No.: US 7,649,274 B2
(45) Date of Patent: Jan. 19, 2010

(54) TURBINE WITH CONSTANT VOLTAGE AND FREQUENCY OUTPUT

(75) Inventor: Richard Burt, Wolfeboro Falls, NH (US)

(73) Assignee: Windera Power Systems, Inc., Wolfeboro Falls, NH (US)

( * ) Notice: Subject to any disclaimer, the term of this patent is extended or adjusted under 35 U.S.C. 154(b) by 117 days.

(21) Appl. No.: 11/704,438

(22) Filed: Feb. 9, 2007

(65) Prior Publication Data
US 2007/0182273 A1    Aug. 9, 2007

Related U.S. Application Data

(60) Provisional application No. 60/766,750, filed on Feb. 9, 2006.

(51) Int. Cl.
| F03B 13/10 | (2006.01) |
| F03B 13/00 | (2006.01) |
| B62J 6/12  | (2006.01) |
| H02K 7/18  | (2006.01) |

(52) U.S. Cl. .................... 290/43; 310/67 A
(58) Field of Classification Search .......... 290/43; 310/67 A
See application file for complete search history.

(56) References Cited

U.S. PATENT DOCUMENTS

| 1,927,208 | A | * | 9/1933 | Gay ..................... 318/771 |
| 3,221,233 | A | * | 11/1965 | Cantonwine ............ 318/773 |
| 3,624,471 | A | * | 11/1971 | Japp et al. ............. 318/771 |
| 3,935,519 | A | * | 1/1976 | Pfarrer et al. .......... 388/838 |
| 4,035,701 | A | * | 7/1977 | Jensen ................. 318/771 |
| 4,495,451 | A | * | 1/1985 | Barnard ................ 318/150 |
| 4,675,591 | A | * | 6/1987 | Pleiss ................. 318/773 |
| 4,692,675 | A | * | 9/1987 | Falk ................. 318/400.01 |
| 4,772,842 | A | * | 9/1988 | Ghosh ................. 318/778 |
| 4,792,740 | A | * | 12/1988 | Smith ................. 318/768 |
| 4,890,049 | A | * | 12/1989 | Auinger ............... 318/771 |
| 4,947,072 | A | * | 8/1990 | Watkins et al. .......... 310/179 |
| 5,049,800 | A | * | 9/1991 | Kohari et al. .......... 318/771 |
| 5,068,559 | A | * | 11/1991 | Satake et al. .......... 310/112 |
| 5,068,587 | A | * | 11/1991 | Nakamura et al. ....... 318/771 |
| 5,177,423 | A | * | 1/1993 | Nakamura et al. ....... 318/767 |
| 5,352,964 | A | * | 10/1994 | Nakamura et al. ....... 318/772 |
| 5,614,799 | A | * | 3/1997 | Anderson et al. ...... 318/400.09 |
| 5,821,660 | A | * | 10/1998 | Anderson ............. 310/184 |
| 6,025,693 | A | * | 2/2000 | Smith ................ 318/768 |
| 6,051,951 | A | * | 4/2000 | Arai et al. ............ 318/700 |
| 6,326,713 | B1 | * | 12/2001 | Judson ............... 310/112 |
| 6,380,648 | B1 | * | 4/2002 | Hsu .................. 310/67 A |
| 6,619,918 | B1 | * | 9/2003 | Rebsdorf ............. 416/1 |
| 6,737,786 | B2 | * | 5/2004 | Hsu .................. 310/254.1 |
| RE39,076 | E | * | 4/2006 | von der Heide et al. .. 318/400.4 |
| 7,034,706 | B1 | * | 4/2006 | Nippes ............... 340/648 |

(Continued)

*Primary Examiner*—T C Patel
*Assistant Examiner*—Pedro J Cuevas
(74) *Attorney, Agent, or Firm*—Day Pitney LLP

(57) ABSTRACT

The disclosure relates to a turbine wherein the rotor windings receive current from a CPU-controlled high speed operational amplifier and the stator windings include four-stage poles with configurations controlled by the CPU. The control of the current to the rotor and the control of the configuration of the four-stage poles of the stator windings is used to provide for constant amplitude (i.e., voltage) and frequency output of the turbine over a range of rotational velocities and loads. The turbine can be used in many applications including, but not limited to, wind or water driven applications.

5 Claims, 20 Drawing Sheets

U.S. PATENT DOCUMENTS

| | | |
|---|---|---|
| 7,352,075 B2 * | 4/2008 | Willey et al. .................. 290/44 |
| 7,514,810 B2 * | 4/2009 | Kern et al. .................... 290/52 |
| 2001/0034582 A1 * | 10/2001 | Umezawa et al. ........... 702/136 |
| 2003/0160537 A1 * | 8/2003 | Hsu ........................... 310/254 |
| 2003/0182944 A1 * | 10/2003 | Hoffman et al. .............. 60/772 |
| 2004/0150232 A1 * | 8/2004 | Xu et al. ........................ 290/7 |
| 2007/0126292 A1 * | 6/2007 | Lugg ........................... 310/11 |
| 2008/0001580 A1 * | 1/2008 | Shah ........................... 322/46 |
| 2008/0088200 A1 * | 4/2008 | Ritchey ...................... 310/268 |
| 2009/0102314 A1 * | 4/2009 | Miyata et al. ............... 310/257 |

* cited by examiner

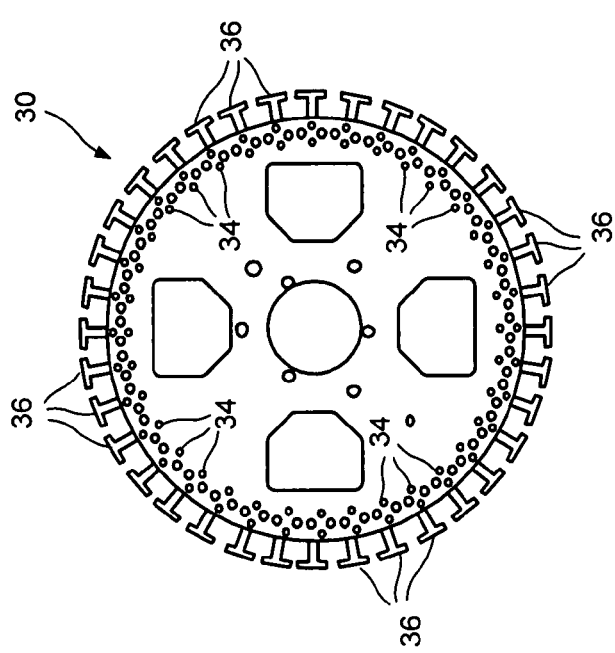
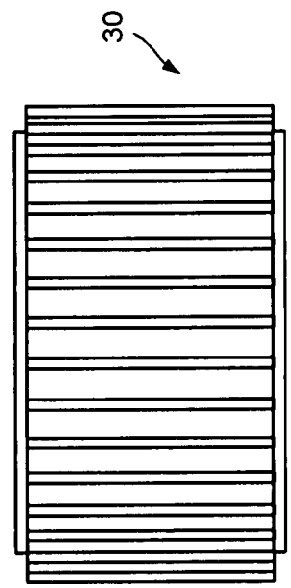
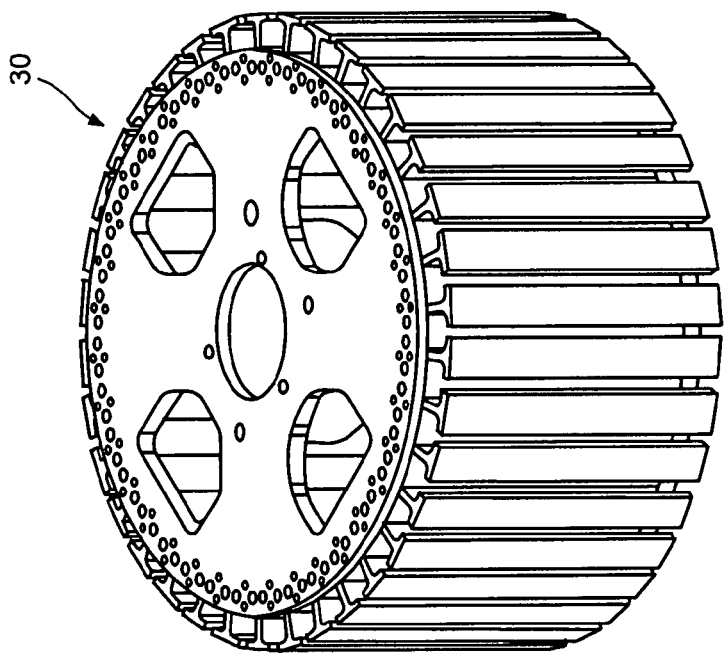
FIG. 9
FIG. 10
FIG. 8

TURBINE WITH CONSTANT VOLTAGE AND FREQUENCY OUTPUT

This application claims priority under 35 U.S.C. §119(e) from provisional patent application Ser. No. 60/766,750 filed on Feb. 9, 2006, the contents of which are hereby incorporated by reference.

BACKGROUND OF THE INVENTION

1. Field of the Invention

The present invention relates to a turbine for applications wherein the revolutions per minute (rpms) may vary, such as with wind or water input, but the voltage and frequency output will stay relatively constant, with variations in the current.

2. Description of the Prior Art

In the prior art, conventional electrical generators may have output currents, voltages and frequencies which typically increase in response to increasing input rpm. Prior art methods have included the use of constant rotational speeds (corresponding to the frequency of the electrical grid), a variable speed gearbox, or cut-in and cut-out speeds to achieve a constant frequency output, this has resulted in reduced output energy and efficiency.

OBJECTS AND SUMMARY OF THE INVENTION

It is therefore an object of the present invention to provide a turbine and associated system which outputs a constant voltage and frequency (AC or alternating current) with a variable current in response to a variable rotational frequency and load.

It is therefore a further object of the present invention to provide a turbine and associated system which maintains a high efficiency throughout a range of rotational frequency and load.

It is therefore a further object of the present invention to provide a turbine and associated system which can be operated in different orientations in order to accommodate both wind-driven and water-driven applications.

These and other objects are attained by providing a generator with a rotor and stator, along with a high resolution encoder to track the rpm and position of the rotor and feed this information to a control system. The stator includes a plurality of four-stage poles about its circumference. The four-stage poles include relays, responsive to the control system, in order to re-configure the electronic configuration of the poles in response primarily to the rpm of the rotor, but also to such variables as winding temperature, load current, load impedance and output impedance, in order to maintain a constant output frequency and voltage (with variability typically allowed in the output amperage). Additionally, the rotor coils receive current from a CPU-controlled high-speed operational amplifier. The waveform of the current from the high-speed operational amplifier is varied in response to comparisons (voltage, frequency and phase) between the output of the stator and the electrical grid to which power is being supplied. This variation of the waveform of the rotor current achieves the desired constant amplitude and frequency output of the stator.

DESCRIPTION OF THE DRAWINGS

Further objects and advantages of the invention will become apparent from the following description and claims, and from the accompanying drawings, wherein:

FIG. 8 is a perspective view of the rotor of the turbine of the present invention.

FIG. 9 is a top plan view of the rotor of the turbine of the present invention.

FIG. 10 is a side plan view of the rotor of the turbine of the present invention.

DETAILED DESCRIPTIONS OF THE PREFERRED EMBODIMENTS

Figure 1:
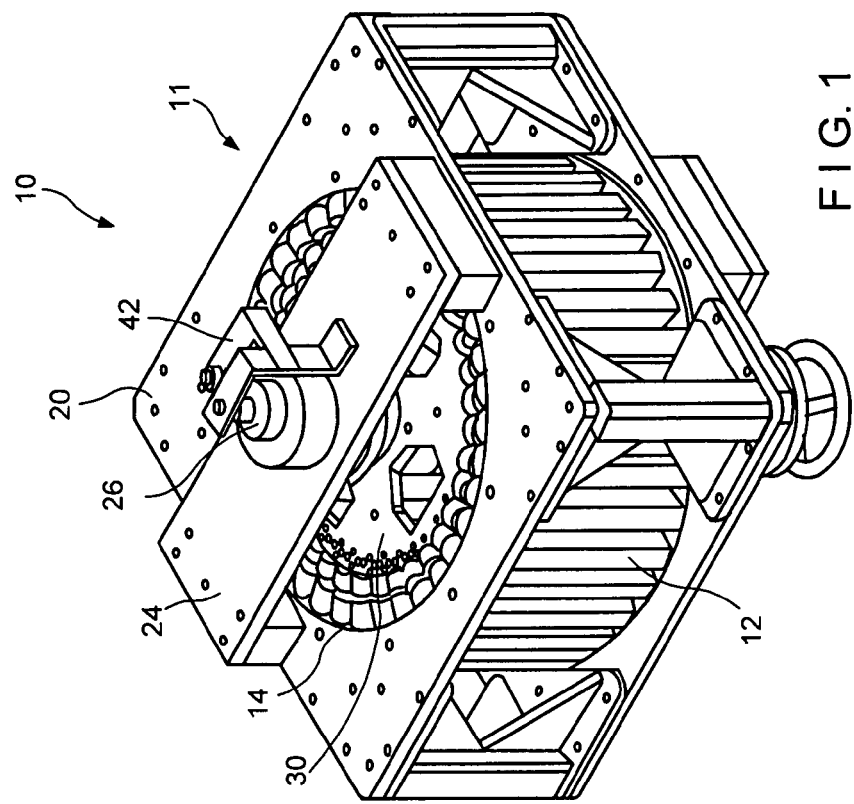
FIG. 1 is a perspective view of the assembled rotor and stator of the turbine of the present invention.
Figure 4:
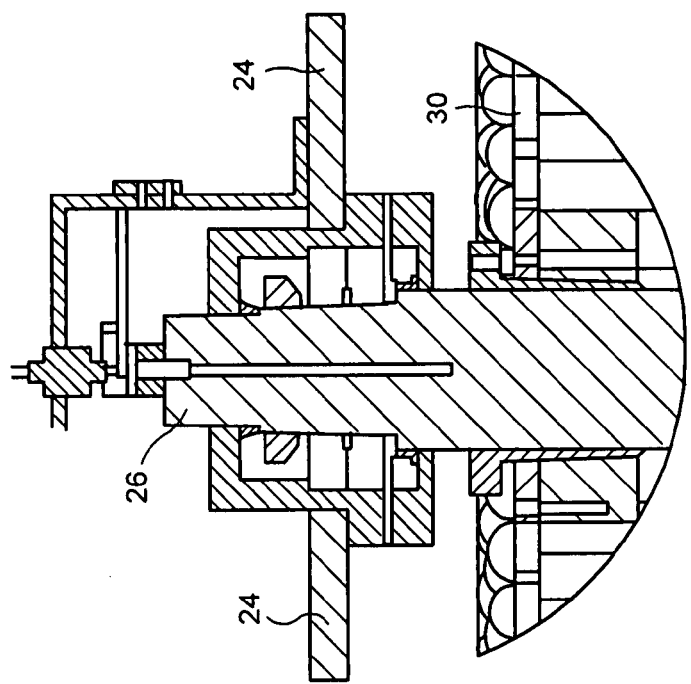
FIG. 4 is an area of detail of FIG. 3.
Figure 3:
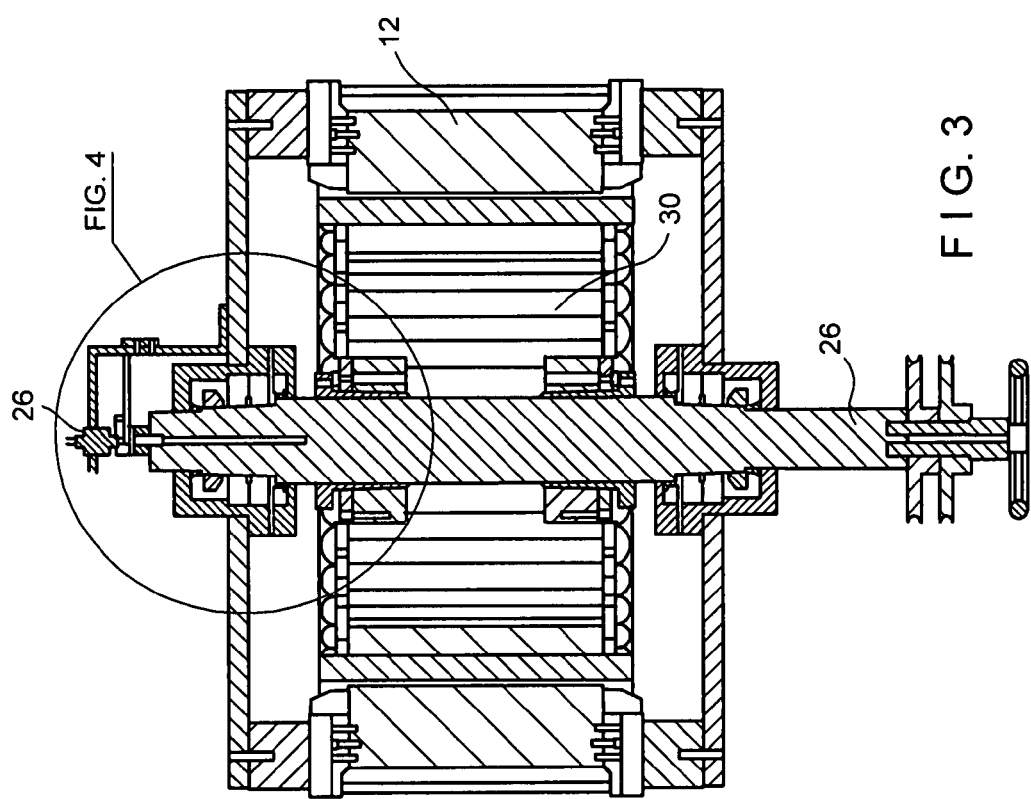
FIG. 3 is a cross-sectional view along plane 3-3 of FIG. 2.
Figure 6:
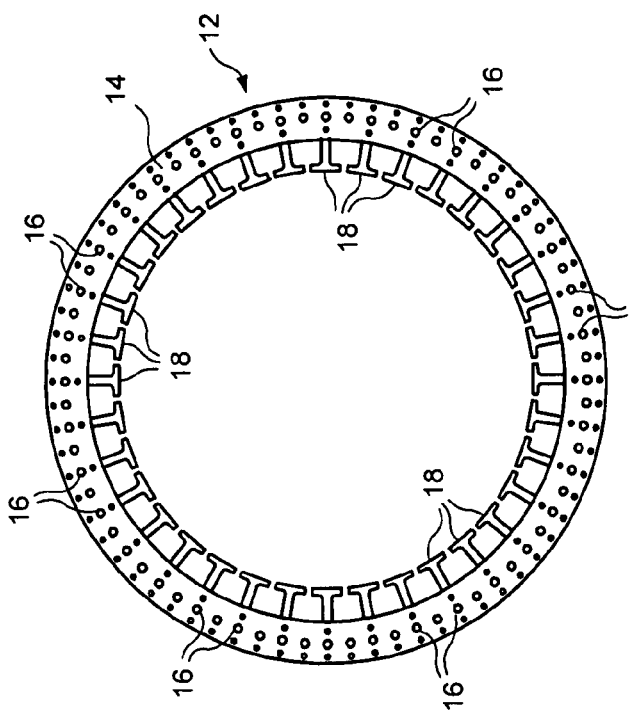
FIG. 6 is a top plan view of the stator of the turbine of the present invention.
Figure 7:
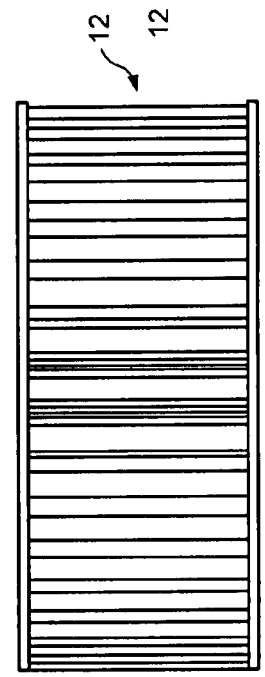
FIG. 7 is a side plan view of the stator of the turbine of the present invention.
Figure 5:
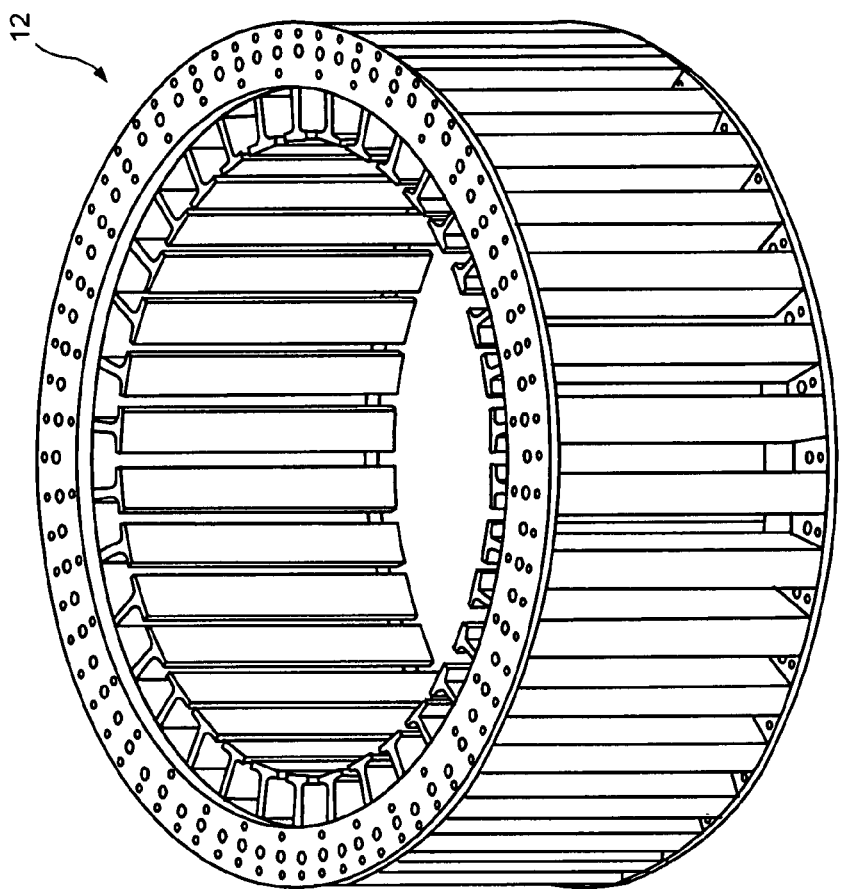
FIG. 5 is a perspective view of the stator of the turbine of the present invention.
Figure 16A:
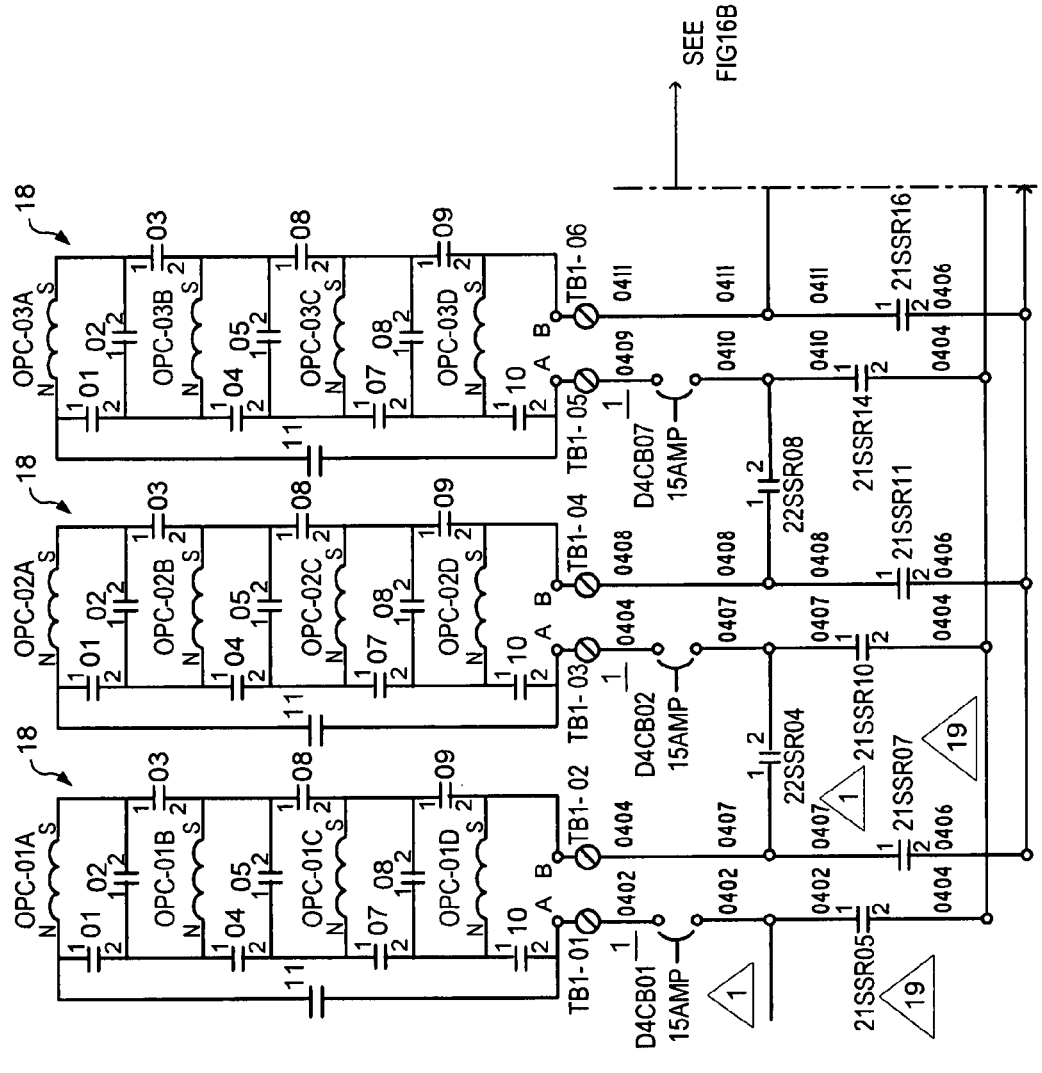
FIG. 16 is a schematic of twelve of the typically thirty-six four-stage poles of the stator of the turbine of the present invention.
Figure 16B:
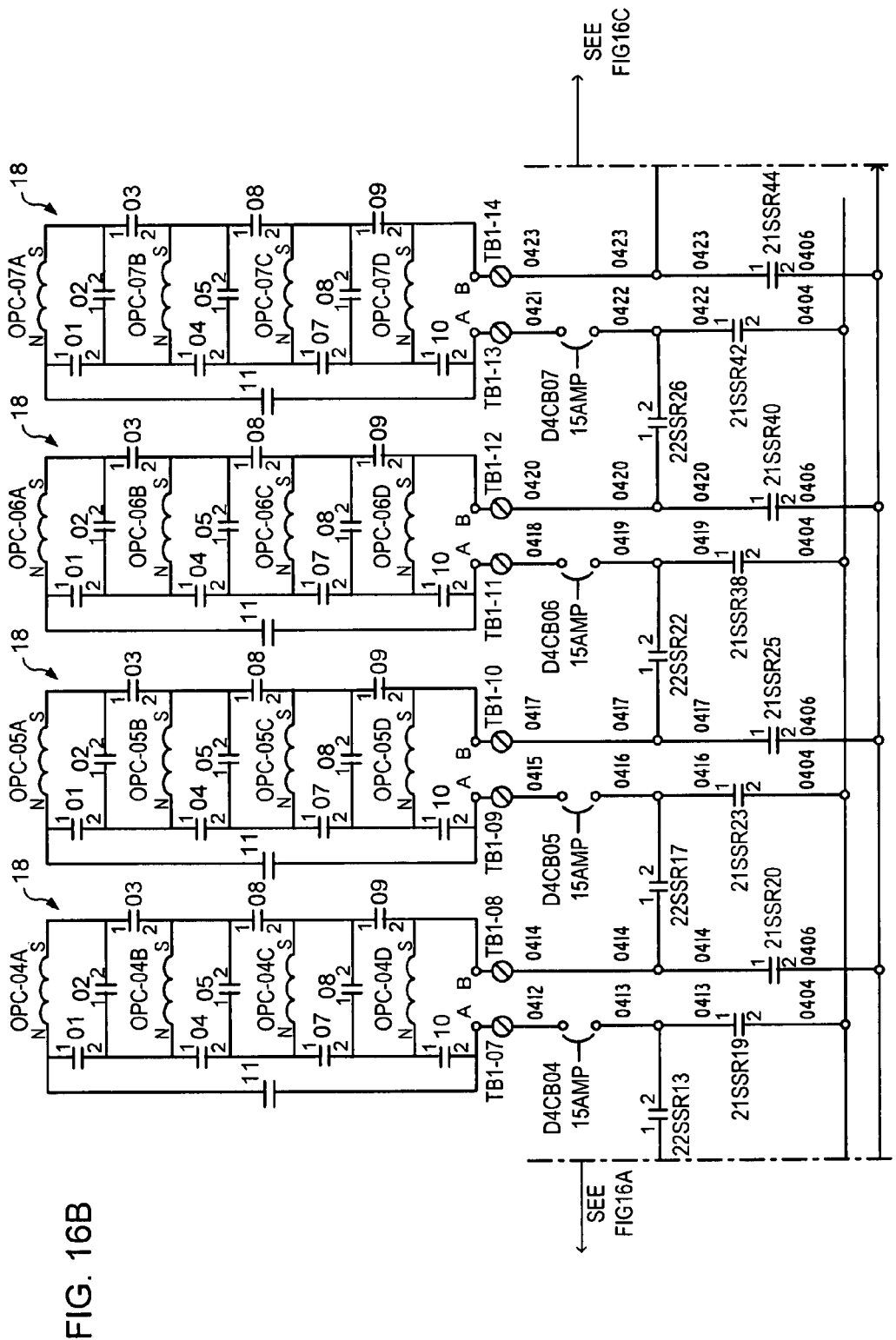
Figure 16C:
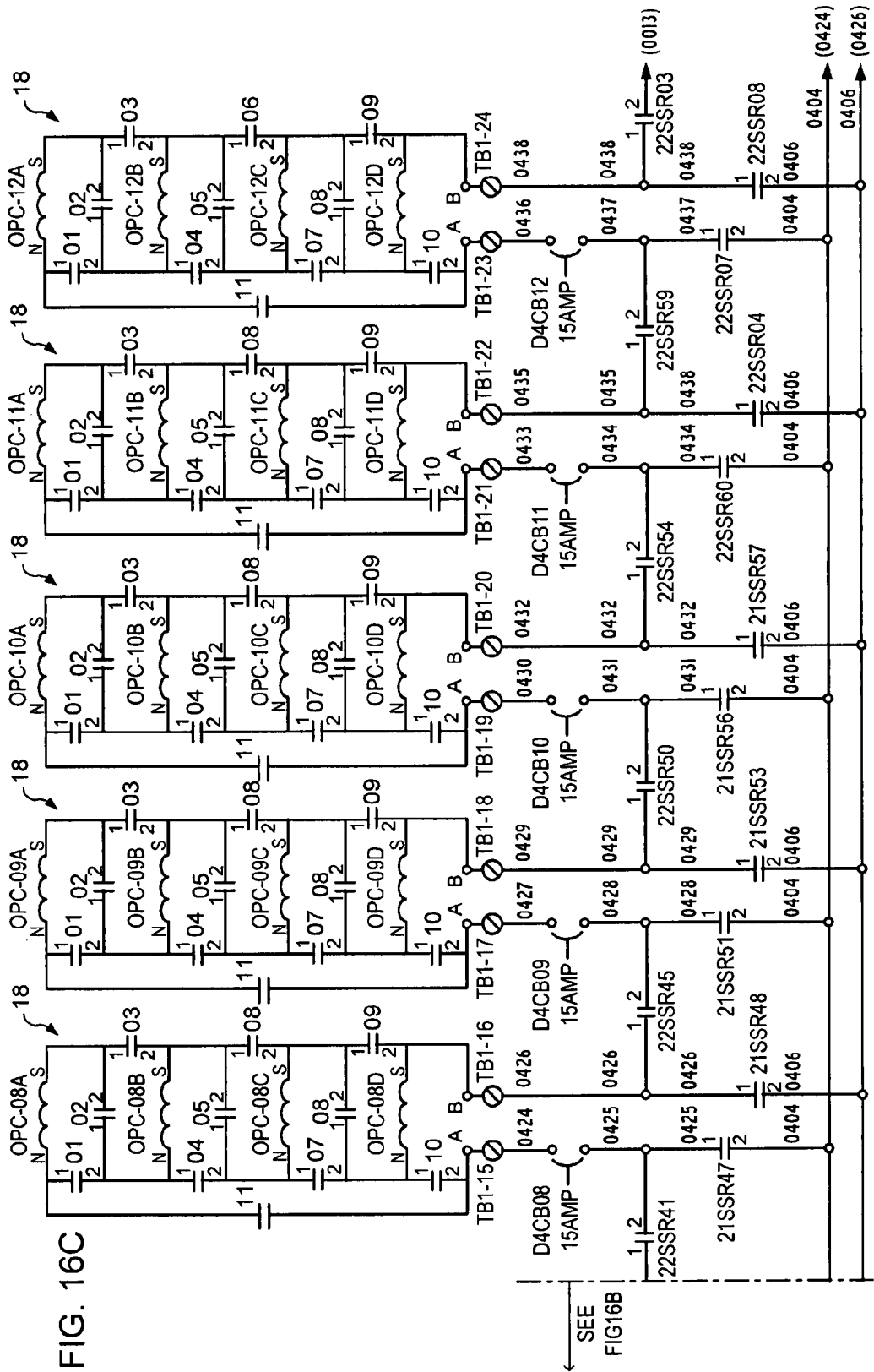

Referring now to the drawings in detail wherein like numerals indicate like elements throughout the several views, one sees that FIG. 1 is a perspective view of the generator mainframe assembly 11 of the turbine 10 of the present invention. Generator mainframe assembly 11 includes stationary stator 12 (also see FIGS. 5-7) of a round or hoop shape supported by stator ring 14, which is typically non-ferrous (such as, but not limited to, aluminum or stainless steel). The stator ring 14 supports stator winding blocks 16 about the periphery thereof, which support inwardly extending stator windings 18. The stator ring 14 of FIGS. 5-7 is illustrated with thirty-six stator winding blocks 16 and stator windings 18, but other numbers of stator winding blocks 16 and stator windings 18 may be used. Each stator winding 18 includes a four-stage pole 100 as illustrated in FIG. 16. Moreover, the magnetic polarities of the stator windings alternate around the periphery of stator ring 14 so that, for instance, the north poles point up for every even numbered stator winding and point down for every odd numbered stator winding. That is, each stator winding is adjacent to stator windings with opposite polarity.

Figure 12:
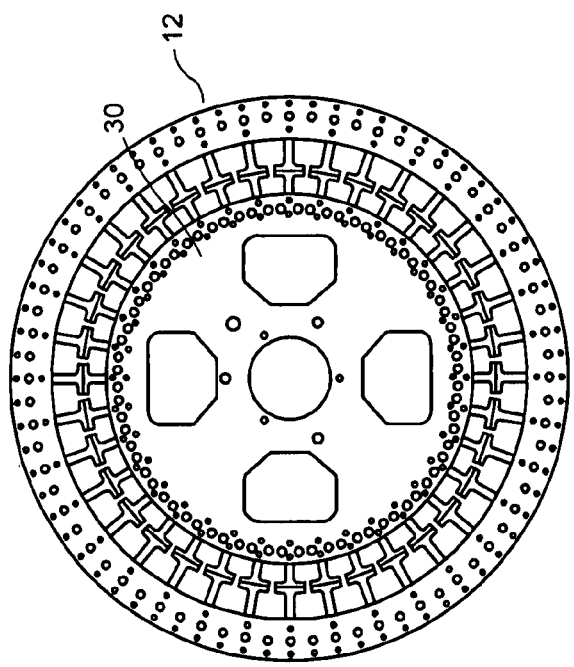
FIG. 12 is a top plan view of the rotor inserted within the stator of the turbine of the present invention.
Figure 13:
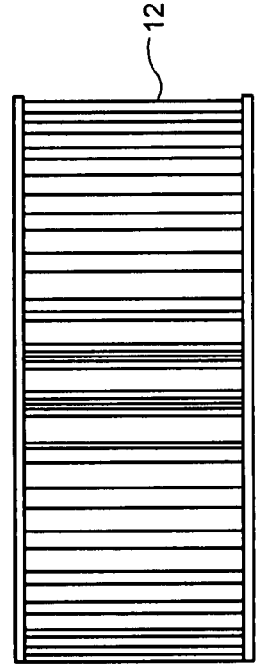
FIG. 13 is a side plan view of the rotor inserted within the stator of the turbine of the present invention.
Figure 11:
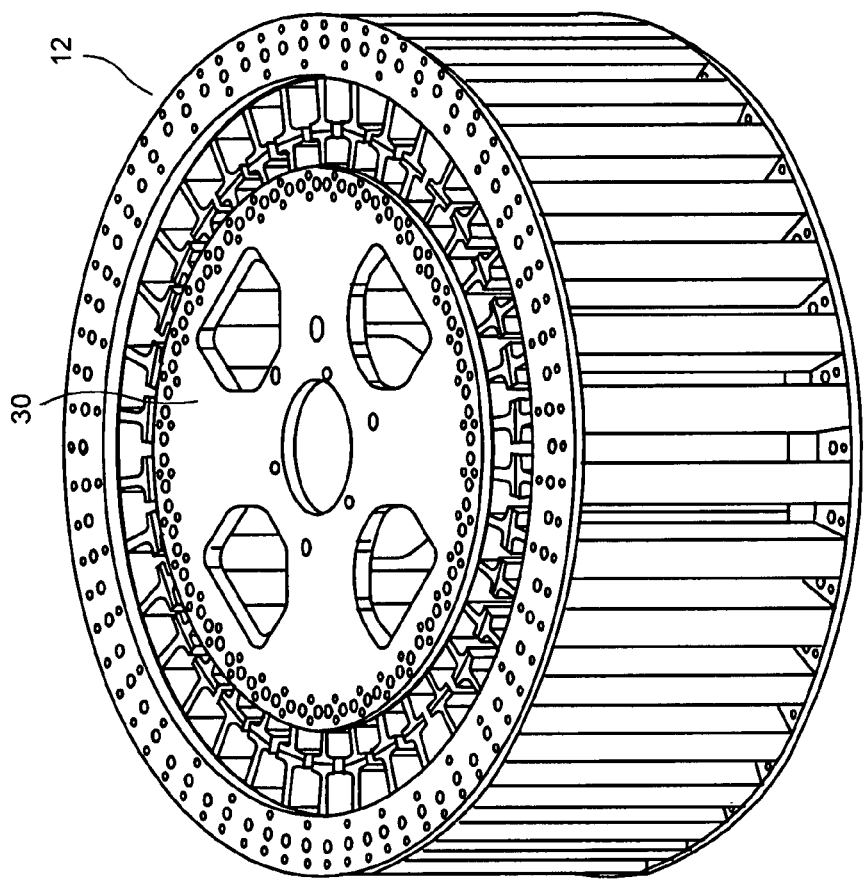
FIG. 11 is a perspective view of the rotor inserted within the stator of the turbine of the present invention.
Figure 15A:
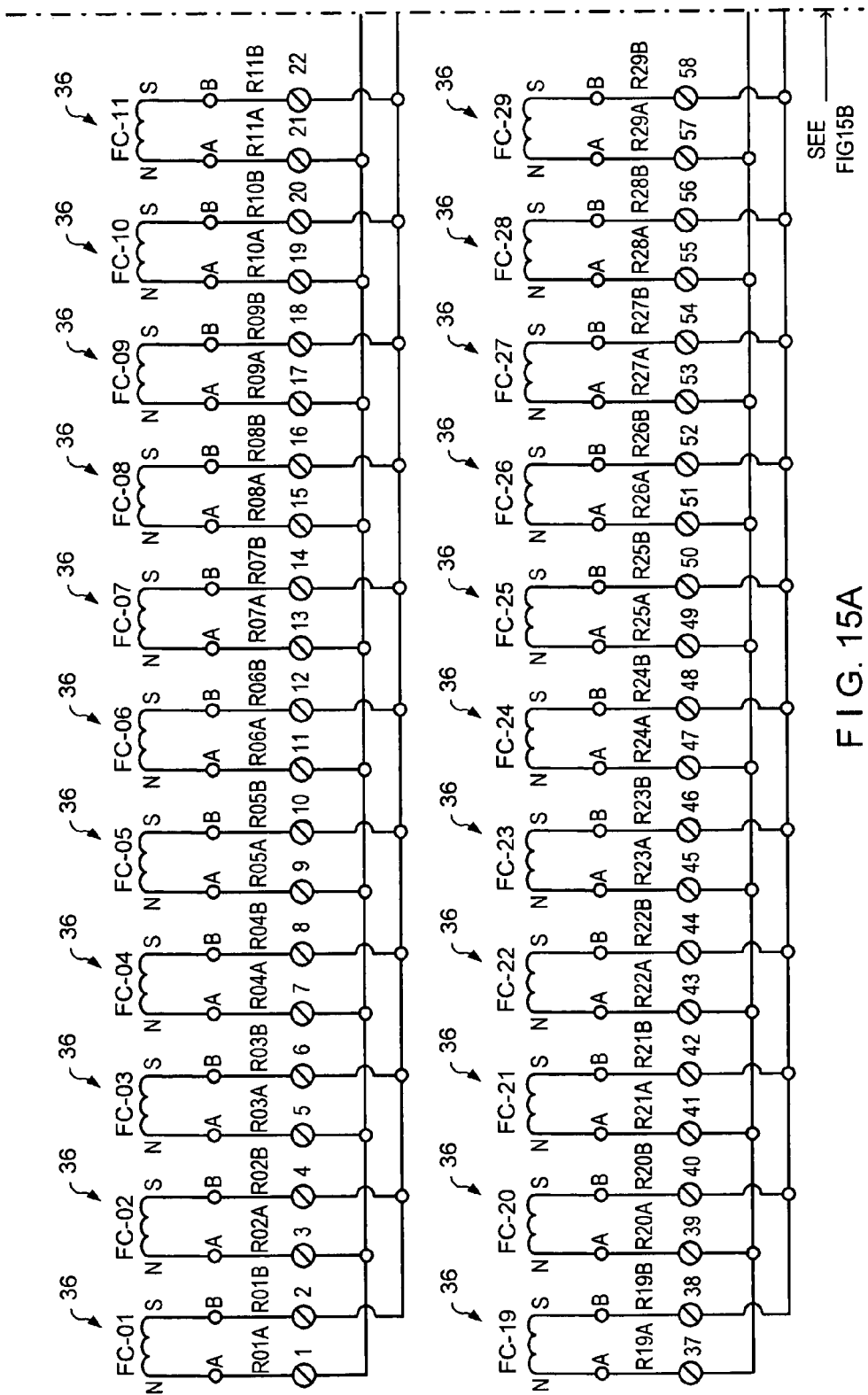
FIG. 15 is a schematic of the field coils of the rotor windings of the turbine of the present invention.
Figure 15B:
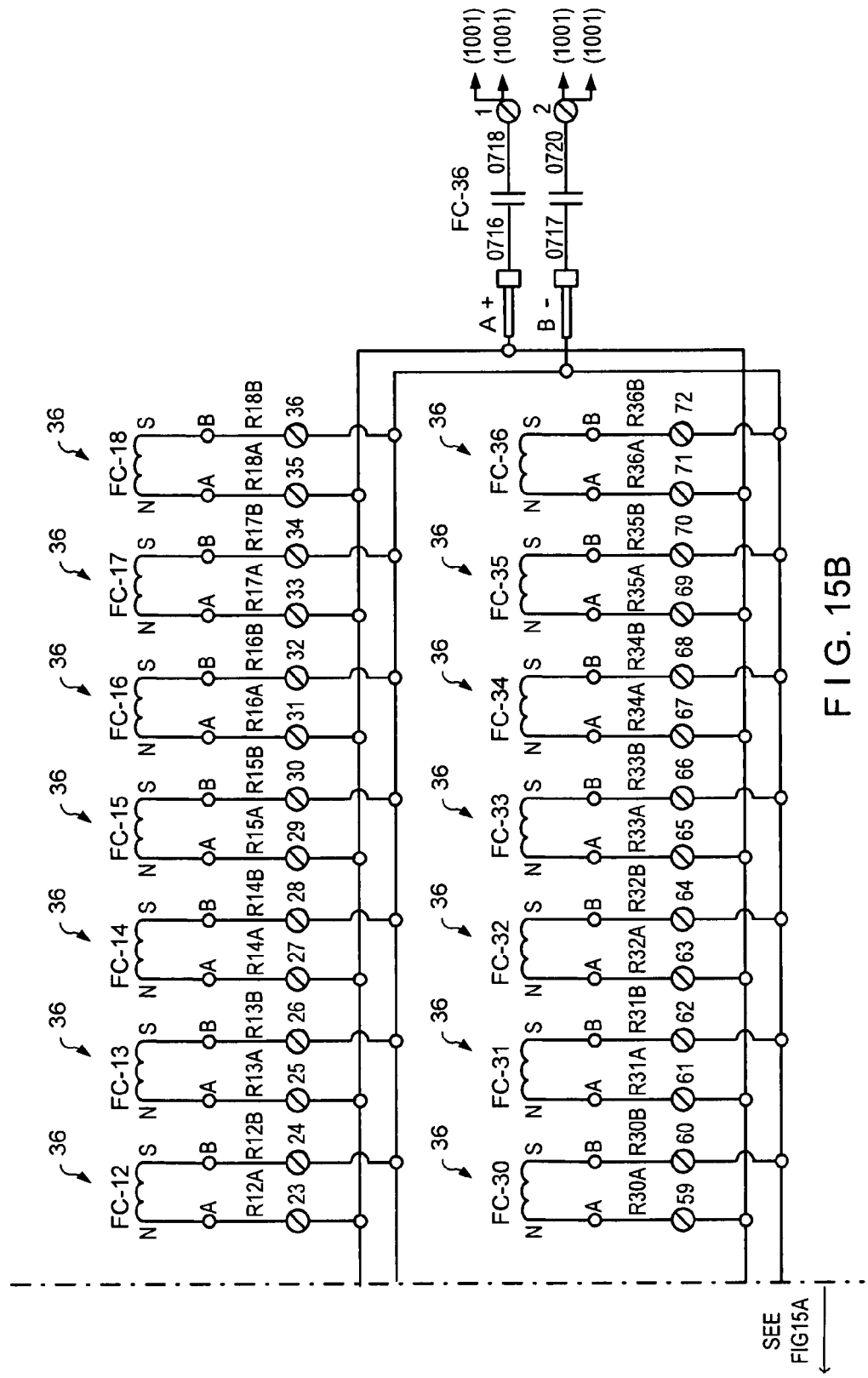

Stator plate 20, with an outer general square shape and an inner aperture 22, holds stator ring 14 and the associated structure in place. Stator plate 20 holds rotor plate 24 in place, so as to span aperture 22 and provide an axis 26 for journaled rotation of rotor 30. As shown in FIGS. 8-10, rotor 30 includes a cylindrical body 32 with rotor winding blocks 34 supporting outwardly extending rotor windings 36 about the periphery thereof. The rotor of FIGS. 8-10 is illustrated with thirty-six rotor winding blocks 34 and rotor windings 36, but other numbers of rotor winding blocks 34 and rotor windings may be used. As exemplified in FIGS. 11-13 wherein the rotor 30 is shown inserted into stator 12, typically the number of windings and winding blocks is the same for the rotor 30 as for the stator 12. Moreover, typically there is an air gap of about 0.015 inch between corresponding stator winding blocks 16 and rotor winding blocks 34 in the configuration shown in FIGS. 11-13. FIG. 15 illustrates the field coils of the rotor windings 36, typically wired in parallel, which function as electromagnets. The field coils of the rotor windings 36 receive electrical current from the CPU-controlled high speed operational amplifier (see element 116 of FIG. 17). The waveform of this electrical current is varied (thereby varying the electromagnet field of the coils) in response to comparisons between the output (voltage, frequency and phase) of the stator 12 and the grid 1000 (likewise including conditions such as voltage, frequency and phase) to which electricity is being supplied.

Rotor plate 24 supports a high resolution quadrature rotary encoder 42 which monitors the position and rotary velocity of rotor 30. Encoder 42 typically 8000 positions per rotation for accurate determination of the position and rotary velocity of rotor 30.

While not illustrated in the drawings, it has been found that the performance of the turbine of the present invention may be improved by placing blocks of ferrous metal between adjacent stator winding blocks 16 and using servos or similar devices to move the blocks in alternating directions (e.g., even numbered blocks moved upwardly and odd numbered blocks moved downwardly) as the rotational velocity of the rotor increases.

Figure 14:
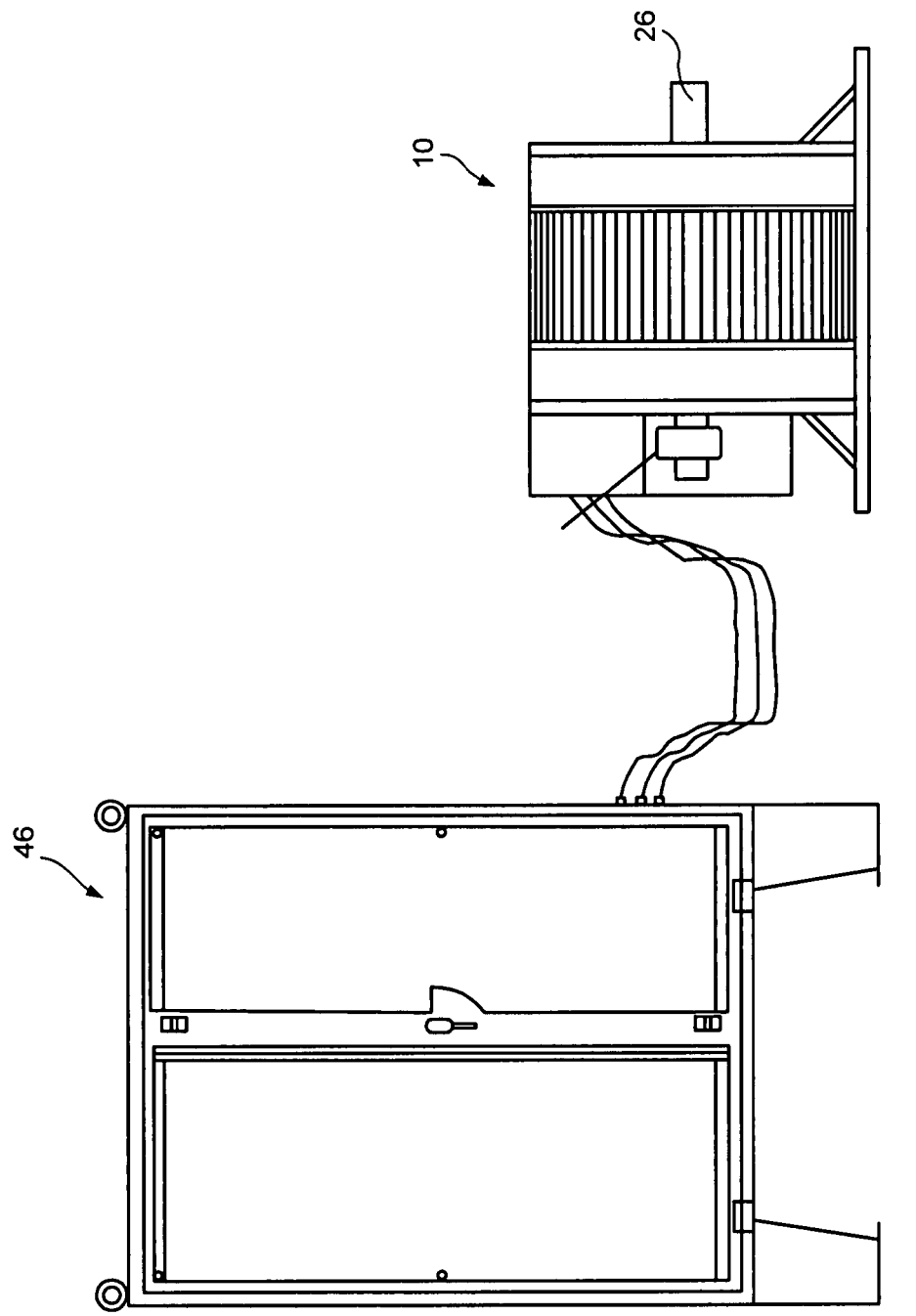
FIG. 14 is a plan view of the turbine of the present invention, with the associated control system in a cabinet configuration.

FIG. 14 illustrates the turbine 10 in a configuration wherein the axis of rotation of rotor 30 is horizontal. However, it is envisioned that turbine 10 could be configured with either a horizontal (such as would typically be used for a water-driven application) or vertical (such as would typically be used for a wind-driven application) configuration. Additionally, FIG. 14 illustrates cabinet 46 which houses the electronic controls (described herein). However, it is envisioned that some applications would include the electronics in a housing integrated into the chassis of the mainframe assembly.

FIG. 16 illustrates twelve (out of a total of thirty-six) of the four-stage poles of the stator windings 18. The four-stage poles of stator windings 18 can be configured by the illustrated relays in any of the following configurations:

1. series;
2. parallel;
3. stage 1 only;
4. stage 1 and 2 in parallel;
5. stage 1, 2 and 3 in parallel;
6. stage 1, 2, 3 and 4 in parallel;
7. stage 1 and 2, in series;
8. stage 1, 2 and 3, in series; and
9. stage 1, 2, 3 and 4, in series.

By changing the pole winding configuration, impedance and amplitude can be controlled at a wide range of rpm. The overall output amplitude can be controlled by increasing or decreasing the total number of 4 stage poles in the cricket. Each 4 stage pole can be configured in series-parallel: 18 groups with 2 poles per groups, 12 groups with 3 poles per group, 9 groups with 4 poles per groups, 6 groups with 6 poles per group, 3 groups with 12 poles per group, 2 groups with 18 poles per group, or 1 group with 36 poles. All of these configuration changes are discrete changes.

Figure 2:
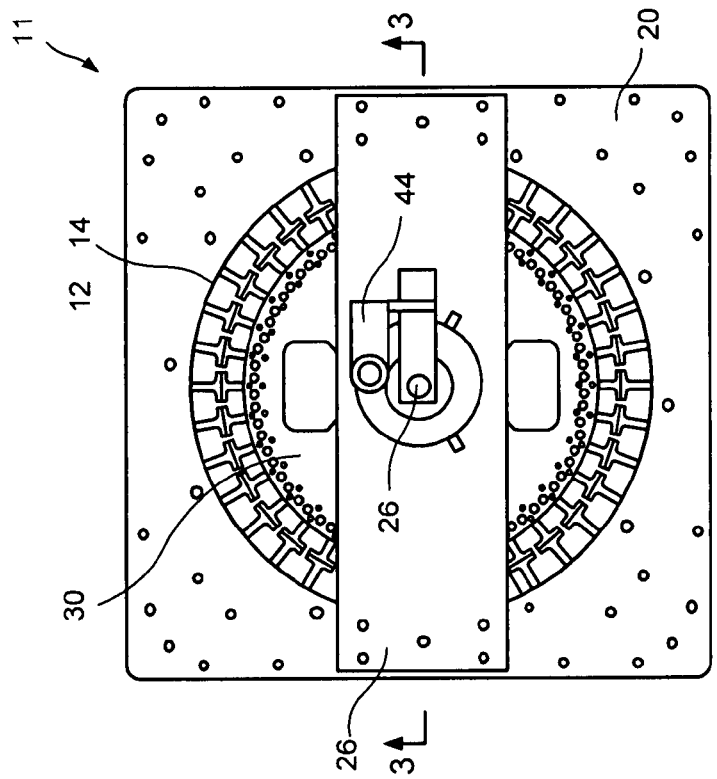
FIG. 2 is a top plan view of the assembled rotor and stator of the turbine of the present invention.
Figure 17:
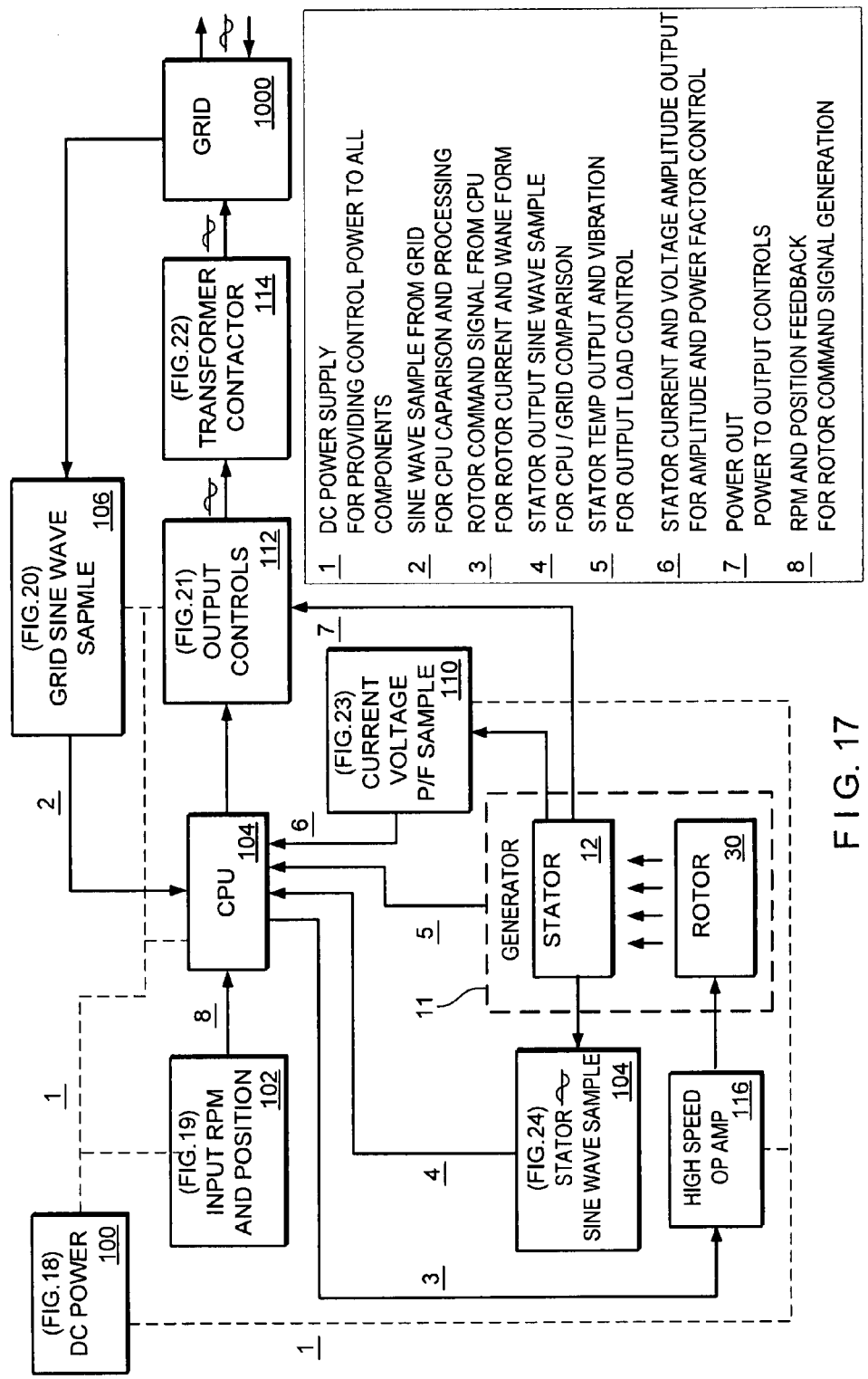
FIG. 17 is a schematic of the control system of the turbine of the present invention.
Figure 18:
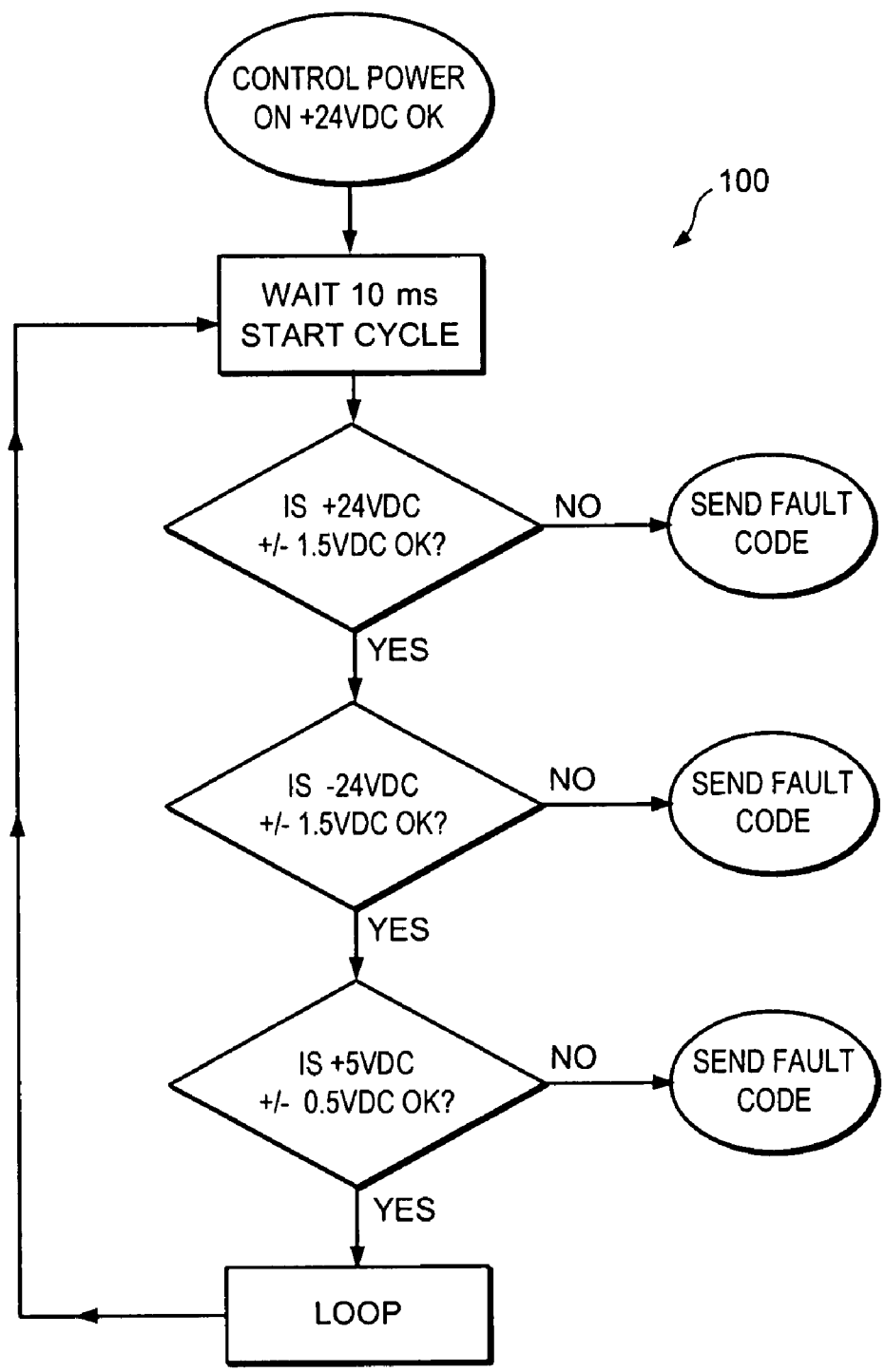
FIG. 18 is a schematic of the DC power block of FIG. 17.
Figure 19:
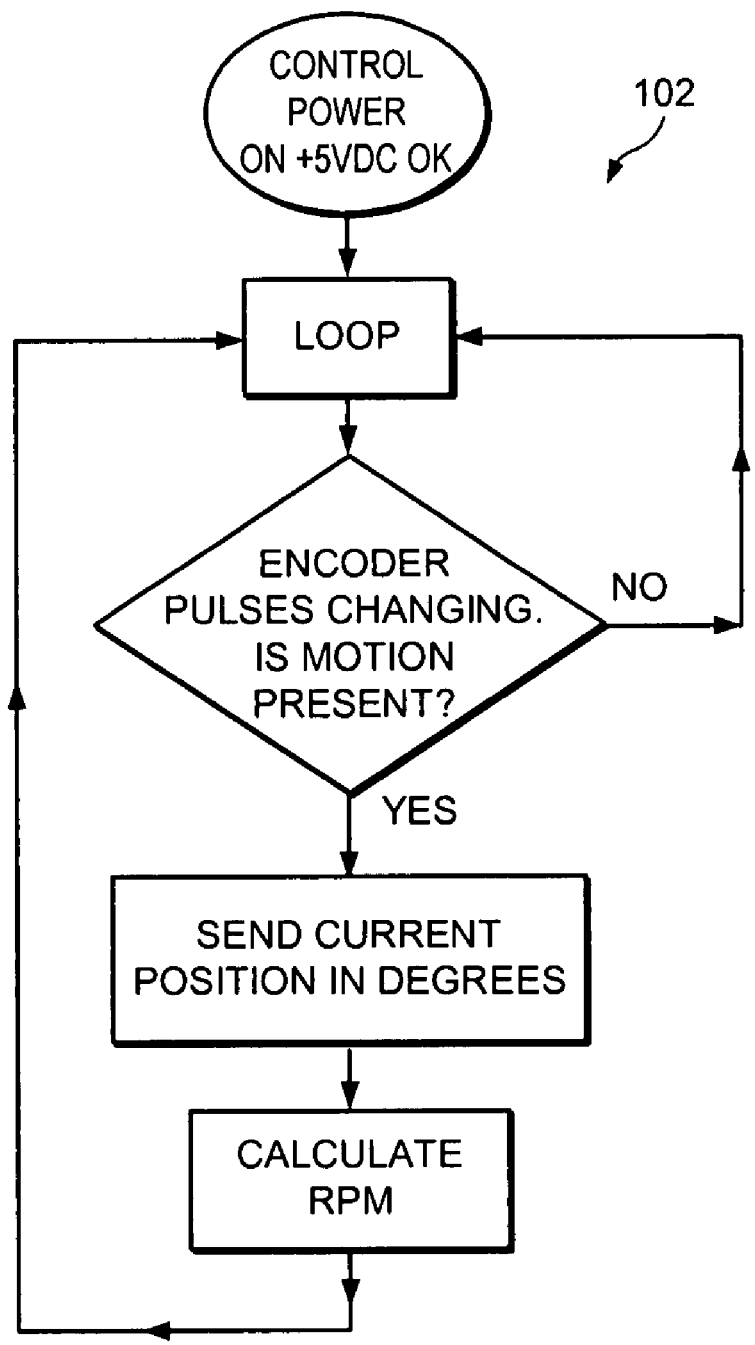
FIG. 19 is a schematic of the input RPM and position block of FIG. 17.
Figure 20:
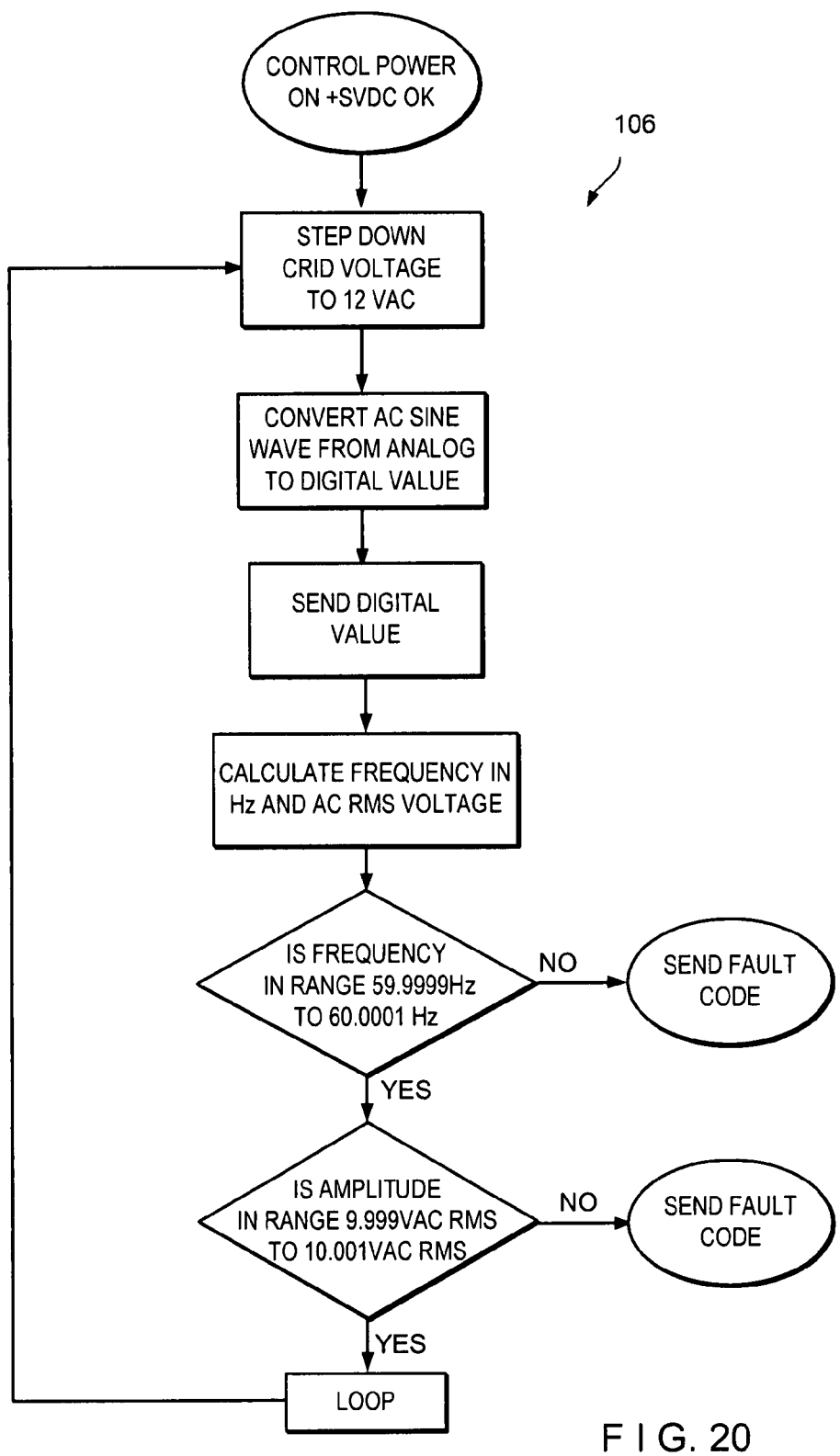
FIG. 20 is a schematic of the grid sine wave sample block of FIG. 17.
Figure 21A:
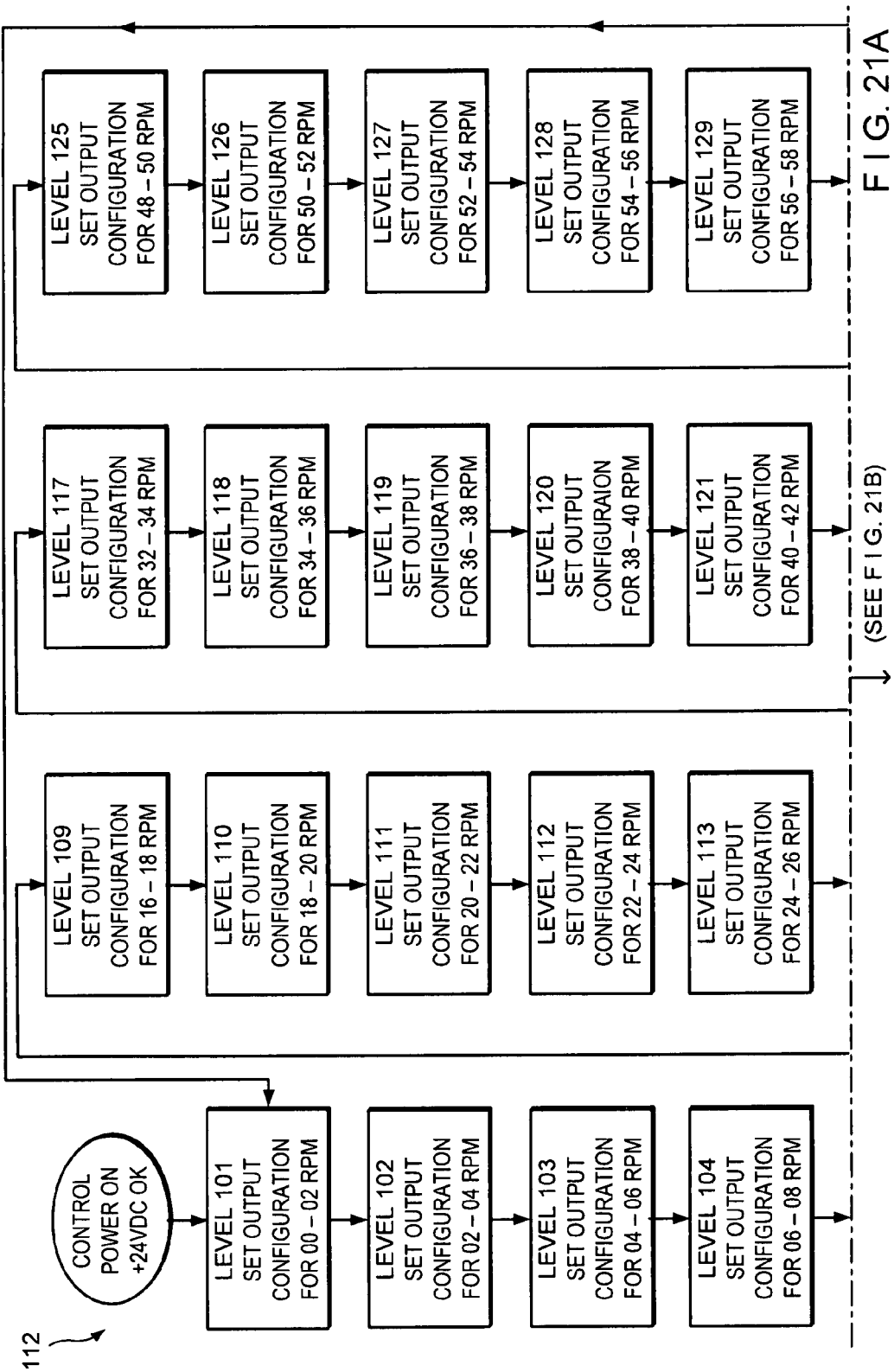
FIG. 21 is a schematic of the output control block of FIG. 17.
Figure 21B:
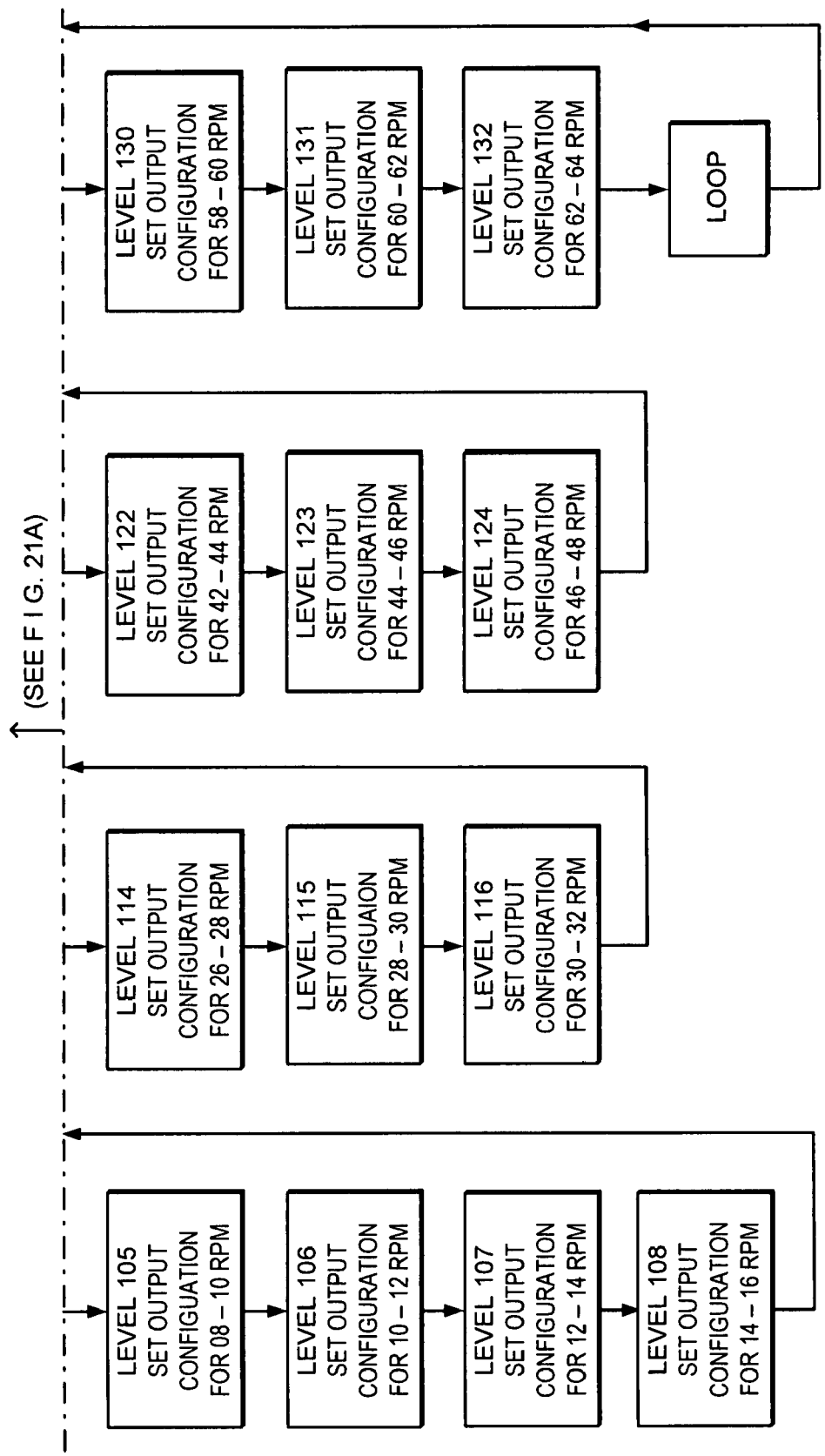
Figure 22:
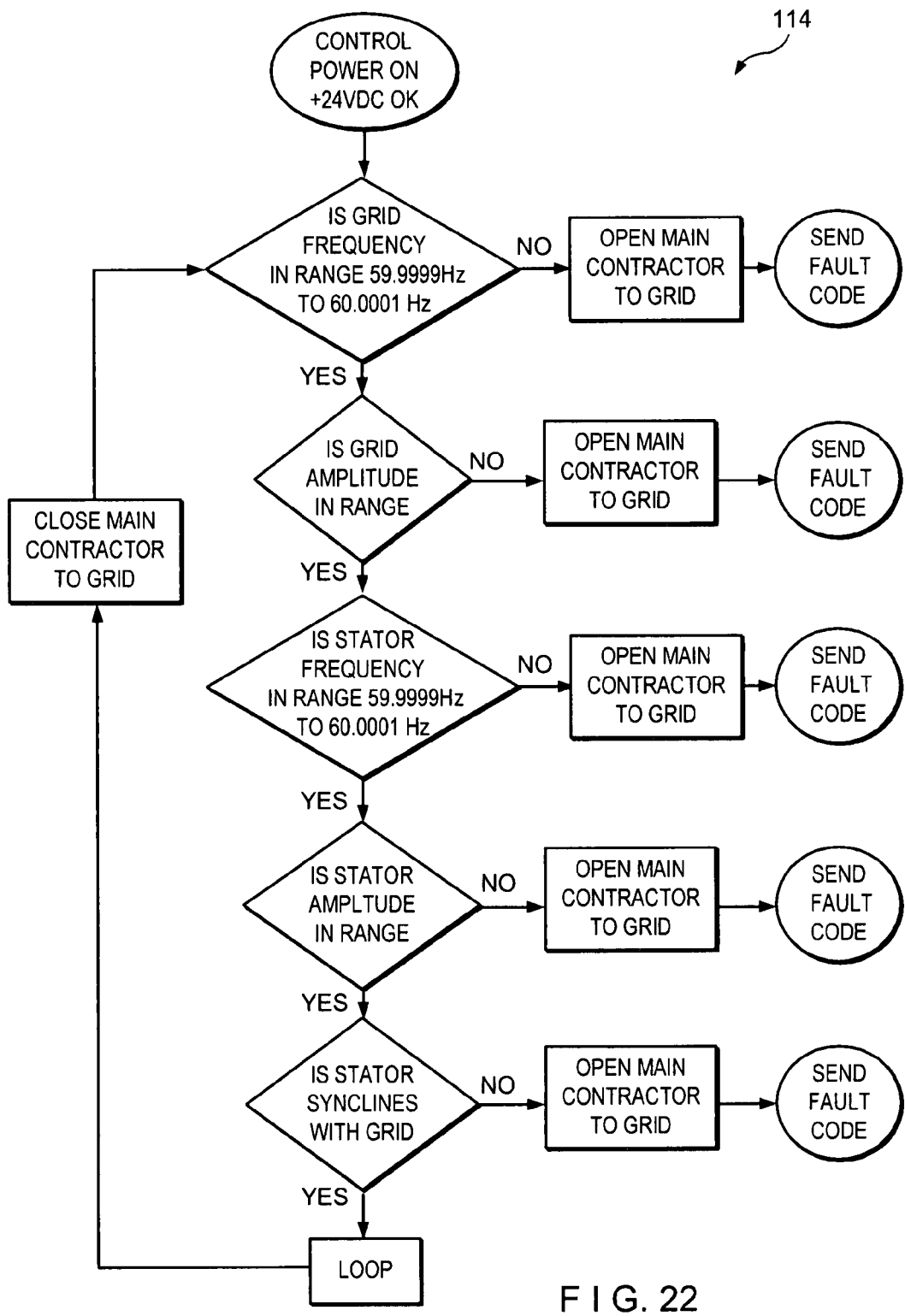
FIG. 22 is a schematic of the transformer contactor block of FIG. 17.
Figure 23:
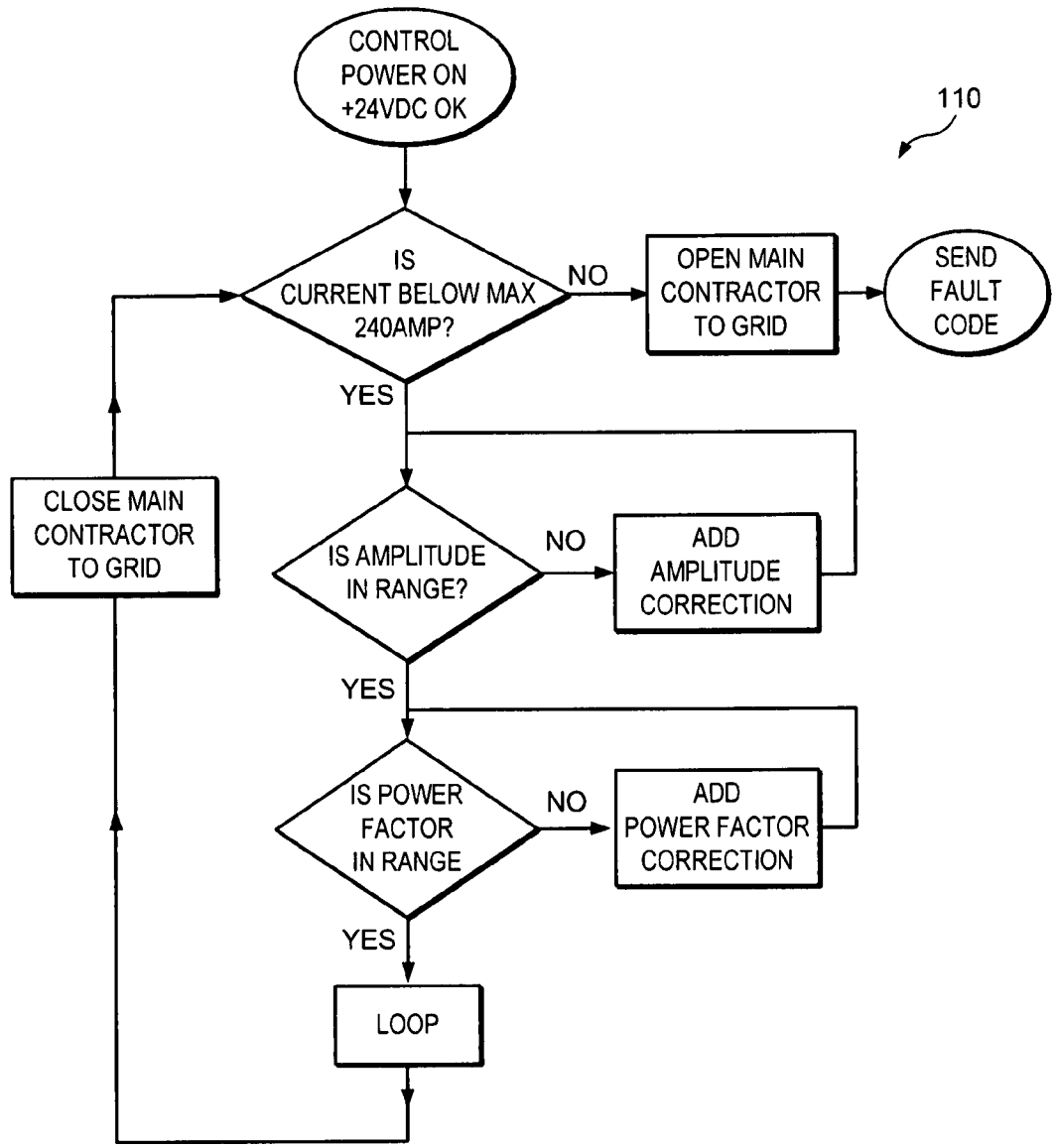
FIG. 23 is a schematic of the current, voltage and power factor sample block of FIG. 17.
Figure 24:
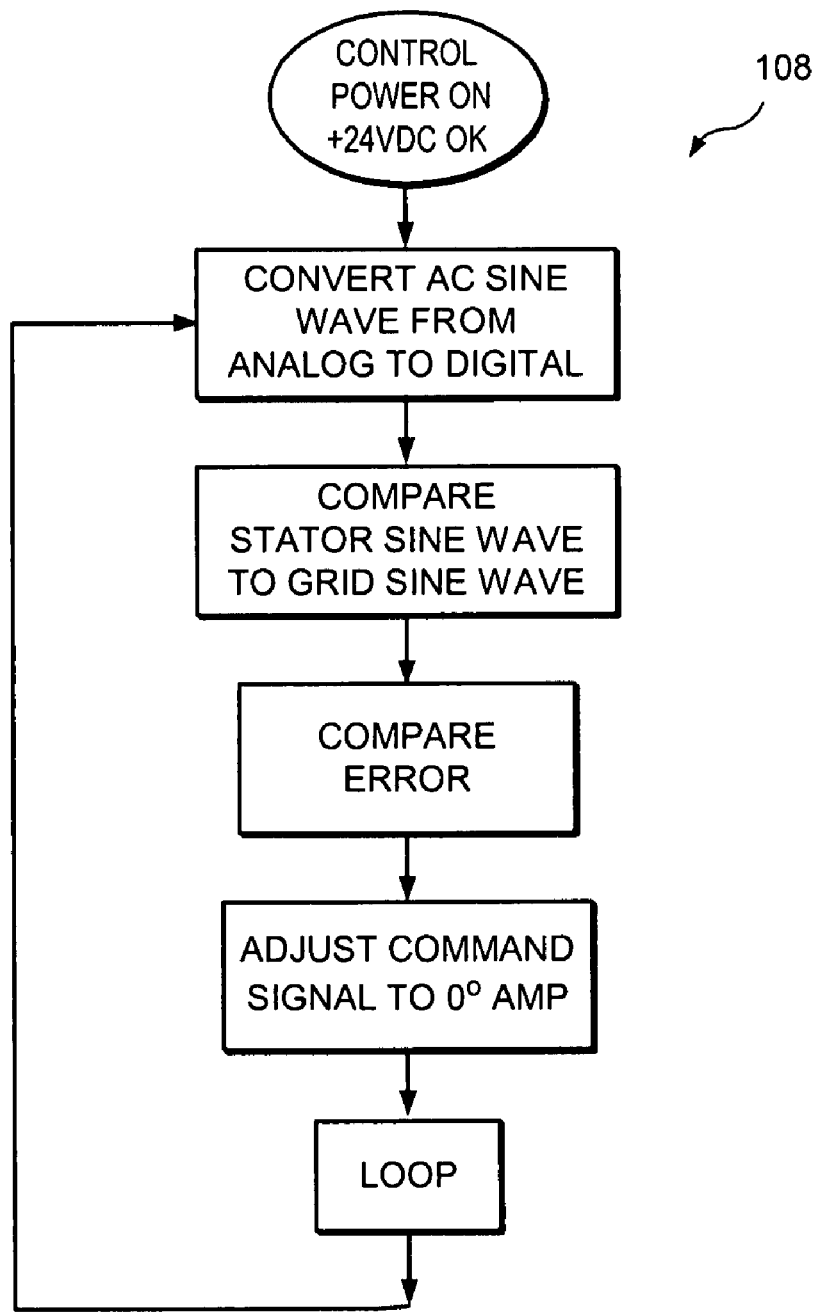
FIG. 24 is a schematic of the stator sine wave sample block of FIG. 17.

FIG. 17 illustrates the control system of turbine 10. DC power block 100 (as shown in FIG. 18) provides 24 volt DC power to the various elements. The rotational position and velocity of rotor 30 is sensed by the rotary encoder 42 of FIG. 2 and fed to input rpm and position block 102 (as shown in FIG. 19). This information is fed to CPU 104. CPU 104 further receives input from the grid sine wave sample block 106 (as shown in FIG. 20) which samples information from the electrical grid 1000; the stator sine wave sample block 108 (as shown in FIG. 24); and the current, voltage and power factor sample block 110 (which receives information from the output of stator 12 and is shown in FIG. 23). CPU 104 further receives temperature, vibration and output load information from the generator mainframe assembly 11. This information is used to control output control block 112 (as illustrated in FIG. 21, which includes the relays for the four-stage poles of FIG. 16), which subsequently is input to transformer contactor block 114 (as illustrated in FIG. 114 to supply constant frequency and amplitude electricity to grid 1000. While FIG. 21 is illustrated as a series of decision blocks based on rotor rpm, a look-up table is equally applicable.

Additionally, CPU 104 calculates by feed forward, proportional, integral and derivative control loop and algorithm functions, thereby generating output which is fed to high speed op amp 116 which controls the amplitude and waveform in the current though the rotor windings 36 in rotor 30, thereby controlling the frequency and waveform of the output of stator 12.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A turbine for supplying electricity, including:
   a rotor with rotor coils about a periphery thereof, said rotor including an axis for rotation;
   a stator with an opening for receiving said rotor, said stator including stator coils about a periphery of said opening, wherein said stator coils are configured as poles with a plurality of stages, wherein the electrical configurations of said stages of said stator coils are controlled by a switching device in order to maintain relatively constant voltage and frequency output;
   an encoder for monitoring rotational characteristics of said rotor;
   a control unit receiving input from said encoder and controlling said switching device, said control unit further including a grid sine wave sampling block which receives information from electrical grid sensors regarding electrical conditions of an electrical grid to which said turbine is supplying electricity;

a turbine electric power output sensor connected in electrical communication to said control unit, wherein said control unit further receives information regarding electrical output of said turbine; and wherein said rotor coils are configured as electromagnets receiving a variable current, said variable current being controlled by said control unit.

2. The turbine of claim 1 wherein said control unit performs a comparison step regarding electrical output of said turbine to electrical conditions of an electrical grid, as detected by said grid sine wave sampling block, to which said turbine is supplying electricity.

3. The turbine of claim 2 wherein controls said switching device in response to said comparison step.

4. The turbine of claim 3 wherein said poles are four-stage poles.

5. The turbine of claim 4 wherein said rotor coils are configured electrically in parallel with each other.

* * * * *